(12) United States Patent
Small

(10) Patent No.: US 7,832,743 B2
(45) Date of Patent: Nov. 16, 2010

(54) DEVICE FOR MANUALLY TRANSPORTING A CARCASS

(76) Inventor: Alan J. Small, 42 Maple St., Rifton, NY (US) 12471-0138

( * ) Notice: Subject to any disclaimer, the term of this patent is extended or adjusted under 35 U.S.C. 154(b) by 368 days.

(21) Appl. No.: 11/398,925

(22) Filed: Apr. 6, 2006

(65) Prior Publication Data

US 2007/0235958 A1    Oct. 11, 2007

(51) Int. Cl.
B62B 15/00 (2006.01)
(52) U.S. Cl. ............... 280/19; 224/921; 5/627; 5/628
(58) Field of Classification Search ........... 280/15, 280/18, 19; 224/921; 5/627, 628
See application file for complete search history.

(56) References Cited

U.S. PATENT DOCUMENTS

| | | | | | |
|---|---|---|---|---|---|
| 519,271 | A | * | 5/1894 | Rawlings | ............... 224/648 |
| 870,462 | A | * | 11/1907 | Penington | ................ 280/19 |
| 2,394,805 | A | * | 2/1946 | Reishus | ................. 224/250 |
| 3,771,808 | A | * | 11/1973 | Duerst | .................... 280/19 |
| 4,132,427 | A | * | 1/1979 | McGee | ................... 280/19 |
| 4,215,877 | A | * | 8/1980 | Pritchett | ................ 280/652 |
| 4,887,823 | A | * | 12/1989 | Hallett et al. | ........... 280/19 |
| 5,189,746 | A | * | 3/1993 | Horie | ...................... 5/627 |
| 5,329,934 | A | * | 7/1994 | Bowman | ................. 5/603 |
| 5,839,137 | A | * | 11/1998 | Butler et al. | .............. 5/627 |
| 6,216,296 | B1 | * | 4/2001 | Carrasco | .................. 5/625 |
| 6,253,569 | B1 | * | 7/2001 | Hall | .................... 62/457.2 |
| 6,889,882 | B1 | * | 5/2005 | Leep | .................... 224/579 |

* cited by examiner

*Primary Examiner*—Paul N Dickson
*Assistant Examiner*—Bridget Avery
(74) *Attorney, Agent, or Firm*—Cherskov & Flaynik

(57) ABSTRACT

A device for manually transporting a carcass 8 or similar sized object includes a transport member 12, at least one hauling member 18 for manually pulling the transport member 12 with a carcass 8 therein, the hauling member 18 being secured to the transport member 12, at least one carcass member 20 for securing the carcass 8 to the transport member 12, and at least one closing member 22 for wrapping the transport member 12 about the carcass 8.

23 Claims, 15 Drawing Sheets

DEVICE FOR MANUALLY TRANSPORTING A CARCASS

BACKGROUND OF THE INVENTION

1. Field of the Invention

The present invention relates generally to manually dragging or pulling a game carcass from a kill site to a transport vehicle and, more particularly, to hauling a deer carcass over varying terrain without damaging the carcass or straining the back of the person pulling the carcass.

2. Background of the Prior Art

Generally, deer hunters patiently wait upon hunting stands secured in a tree until a deer approaches within a kill range; whereupon, the hunter dispatches the deer, then proceeds to haul the deer carcass to a transport vehicle which may be parked a great distance from the kill site. Occasionally, multiple hunters are spaced over a relatively small area. Two hunters pulling one deer carcass is an optimum method of hauling the carcass over a long distance. However, it is more common for only one person to pull the deer carcass over a trail that includes varying terrains, rocks, brush, weeds, streams and other natural obstacles that can lead to injury to the hunter.

Prior art devices and methods of hauling a deer carcass by one or two persons include wheel carts, hard plastic deer drags, drag harnesses with long leads that wrap around the carcass and allow the carcass to be dragged upon the ground, and drag straps that drag the carcass upon the ground, the drag straps wrapping around a person's waist area or over one shoulder. The problems with the prior art hauling devices is that none entirely encase the carcass to protect the carcass from all natural elements; that the prior art devices do not secure the carcass to the inside of the hauling device or provide a means for adjustably securing the carcass to the inside of the hauling device; that the prior art devices do not secure the hauling device about the carcass after encasing the carcass; and that the prior art devices do not reduce back strain upon and increase the balance of the person pulling the device with the carcass therein.

A need exist for a device that protects the deer carcass while being pulled upon the ground; that reduces the pulling force required to haul the carcass to a transport vehicle; that allows the pulling force to be generated by the hunter's shoulders thereby reducing back strain; that tightly and adjustably cinches the carcass to device; that completely and tightly encases the carcass; that is quickly cleaned and sanitized; and that includes optional features that enable a hunter to carry extra equipment to the hunting site.

SUMMARY OF THE INVENTION

It is a principle object of the present invention is to provide a device for manually transporting a carcass or object. A feature of the device is a transport member that is water and tear resistant. An advantage of the device is that a deer or similarly sized animal carcass is wrapped about by the transport member, then manually dragged by a person over varying terrain until reaching a transport vehicle. Another advantage of the device is that the transport member is quickly cleaned and disinfected with liquid compounds after removing the carcass.

Another object of the present invention is to provide a device that allows a person to manually pull the device with a relatively large carcass wrapped therein. A feature of the device is a hauling member or strap assembly that protrudes from a front end of the transport member and is sufficiently secured to the transport member to allow a relatively heavy carcass to be pulled over varying terrain without deforming the straps or transport member. An advantage of the device is that the straps will not tear from the transport member. Another advantage of the device is that the straps can be grasped by a person to allow the person to pull the device and the carcass without straining his or her back. Still another advantage of the device is that the straps can be secured to a safety harness which is cooperatively secured to a person who will pull the device and the carcass therein, the safety harness directing dragging forces away from his or her back thereby avoiding back strain and loss of balance.

Still another object of the present invention is to provide a device that secures the carcass to a carcass engagement side of the transport member. A feature of the device is a carcass member that includes at least one and preferably three non-deformable strap and fastener assemblies that tightly and quickly cinch the carcass to the carcass engagement side of the transport member. An advantage of the device is that the straps are sufficiently long and the fasteners adjustable to promote the securing of varying sized carcasses to the transport member. Another advantage of the device is that the straps and fasteners are sufficient in quantity to engage portions of the carcass that prevent the carcass from sliding out a rear end of the transport member while a person pulls the device and carcass across varying terrains. Still another advantage of the device is that the fasteners are quickly joined together and quickly separated via manual manipulation.

Yet another object of the present invention is to provide a device that adjusts the position of strap and fastener assemblies. A feature of the device is first and second adhesive members permanently joined to preselected ends of the straps and predetermined portions of the. transport member, respectively. Another feature of the device is a grasping member secured to the first adhesive member. An advantage of the device is that the securing forces generated by the cinched straps are focused upon portions of the carcass that promote the retention of the carcass within the transport member while the transport member is manually pulled over varying terrain. Another advantage of the device is that the first and second adhesive members are quickly separated via the grasping member thereby allowing a person to quickly adjust the focus positions of the forces generated by the cinched straps.

Another object of the present invention is to provide a device that secures the transport member about the carcass. A feature of the device is a closing member that includes at least one and preferably three non-deformable strap and fastener assemblies that tightly and quickly cinch the transport member about the carcass after wrapping the transport member about the carcass. An advantage of the device is that the straps are sufficiently long and the fasteners adjustable to promote the securing of the transport member about varying sized carcasses. Another advantage of the device is that the straps and fasteners are sufficient in quantity to engage portions of the carcass that prevent the carcass from sliding out the rear end of the transport member while a person pulls the device and carcass across varying terrains. Still another advantage of the device is that the fasteners are quickly joined together and quickly separated via manual manipulation. Yet another advantage of the device is that the position of the straps and fasteners of the closing member are adjustable via the same first and second adhesive members utilized with the carcass member described above; adjusting the position of the straps and fasteners promotes focused securing forces generated by the cinched straps upon portions of the carcass thereby retaining the carcass inside the transport member while being manually pulled over varying terrain.

Briefly the invention provides a device for manually transporting a carcass comprising a transport member having a ground engagement side and a carcass engagement side; at least one hauling member for manually pulling said transport member with a carcass therein, said hauling member being secured to said transport member; at least one carcass member for securing the carcass to said transport member, said carcass member being secured to said transport member; and at least one closing member for encasing the carcass within said transport member, said closing member being secured to said transport member.

The invention further provides a hunting device for transporting game comprising a carcass encasement member; means for manually pulling said carcass encasement member with a carcass disposed therein over varying terrain; means for adjustably securing the carcass to one side of the carcass encasement member; means for promoting the encasement of the carcass by said carcass encasement member; and means for maintaining said carcass encasement member about the carcass.

The invention further provides a method for manually transporting an object, said method comprising the steps of providing an encasing member; providing means for manually pulling said encasing member; adjustably securing said object to said encasing member; wrapping said encasing member about the object; and maintaining the wrap position of said encasing member about the object.

BRIEF DESCRIPTION OF THE DRAWINGS

These and other objects, advantages and novel features of the present invention, as well as details of an illustrative embodiment thereof, will be more fully understood from the following detailed description and attached drawings, wherein.

DESCRIPTION OF THE PREFERRED EMBODIMENT

Figure 1:
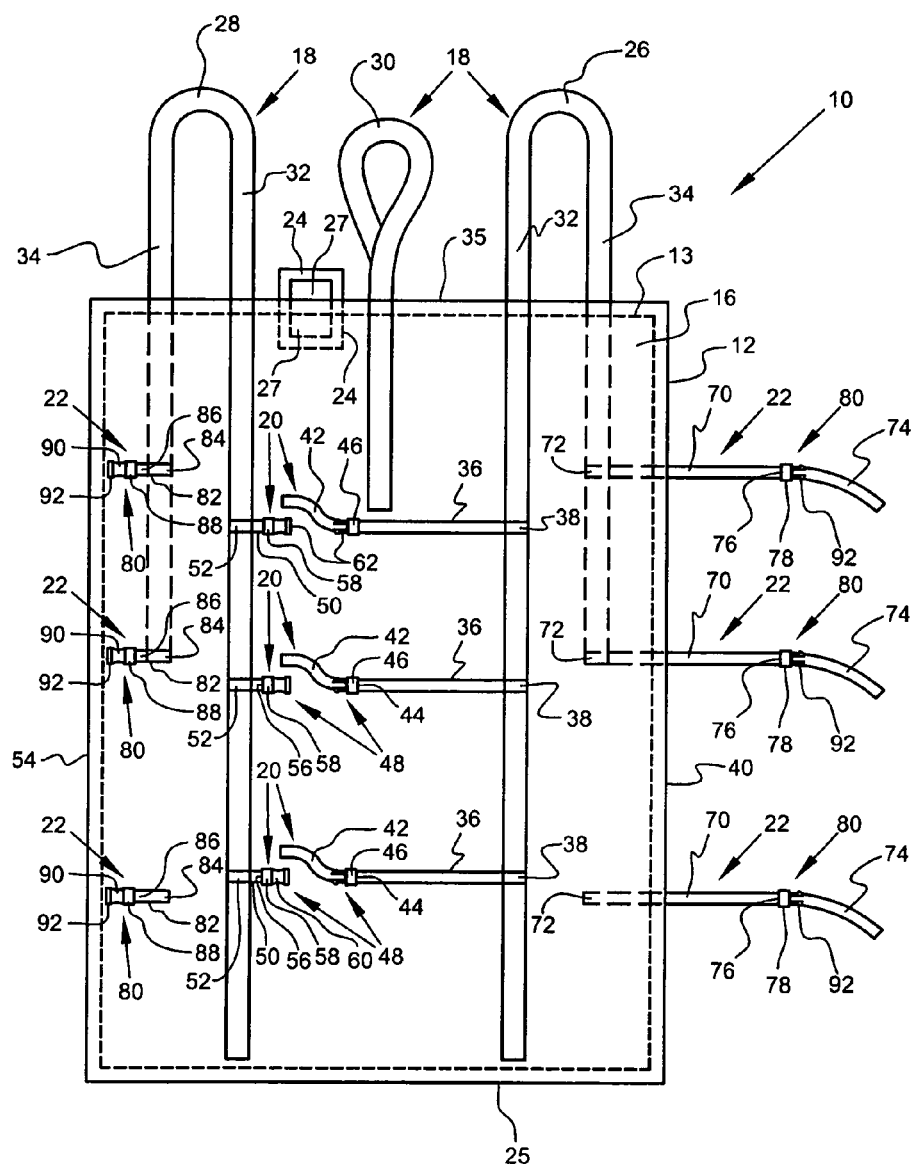
FIG. 1 is a top elevation-phantom view of a device for manually transporting a carcass or object in accordance with the present invention.
Figure 2:
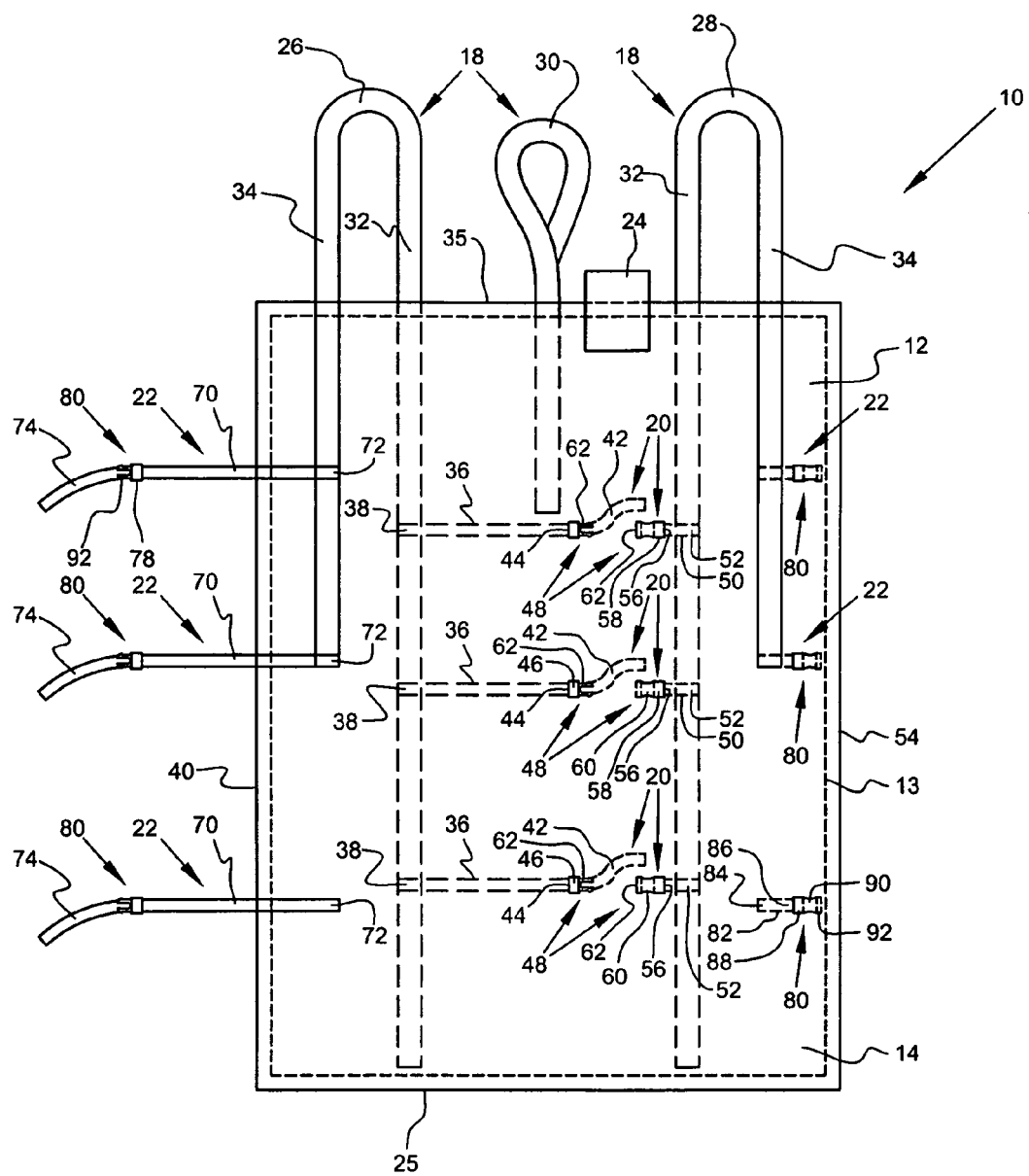
FIG. 2 is a bottom elevation-phantom view of the device of FIG. 1.
Figure 3:
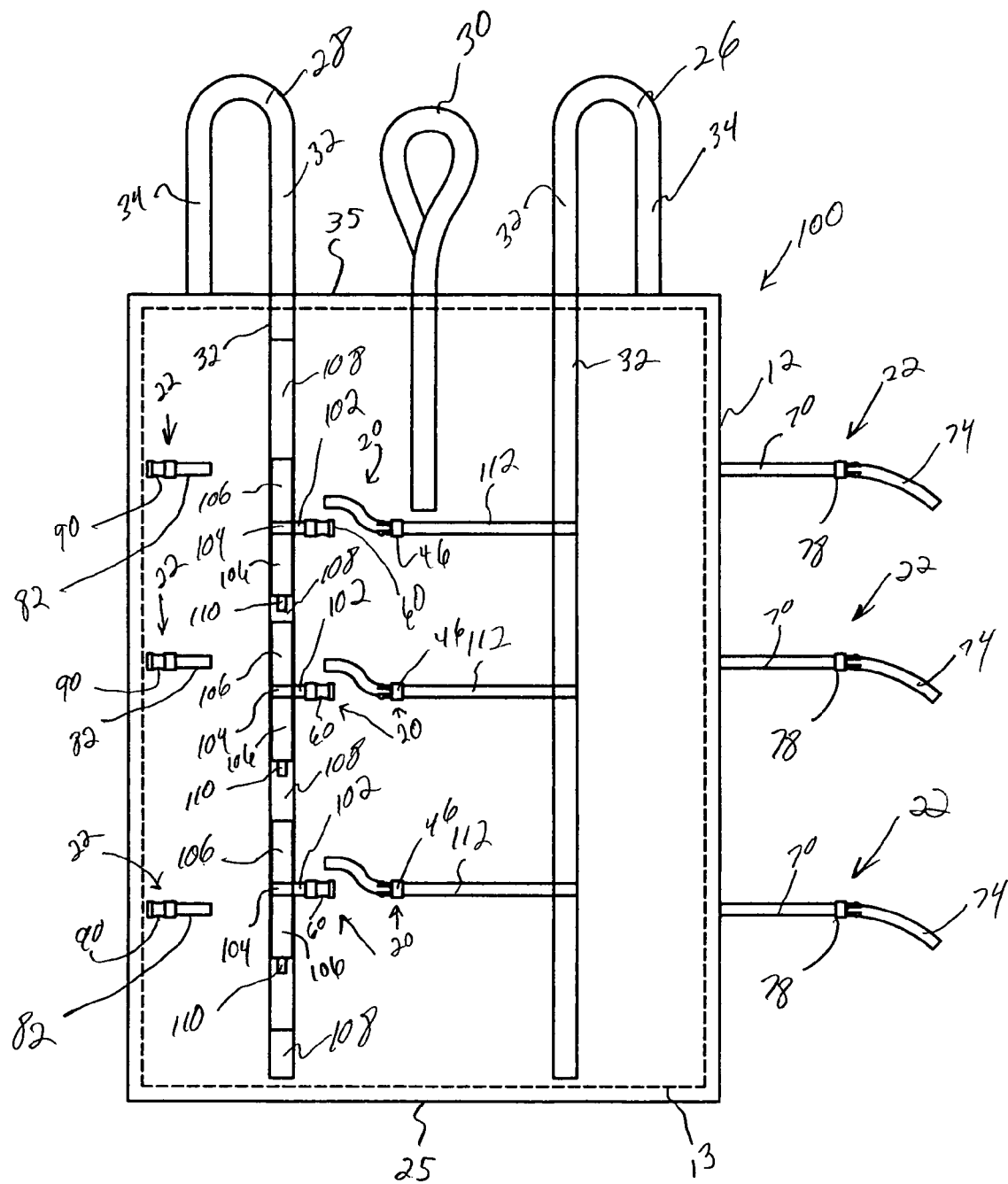
FIG. 3 is a top elevation view of the device of FIG. 1, but with adjustable securing means depicted in accordance with the present invention.
Figure 4:
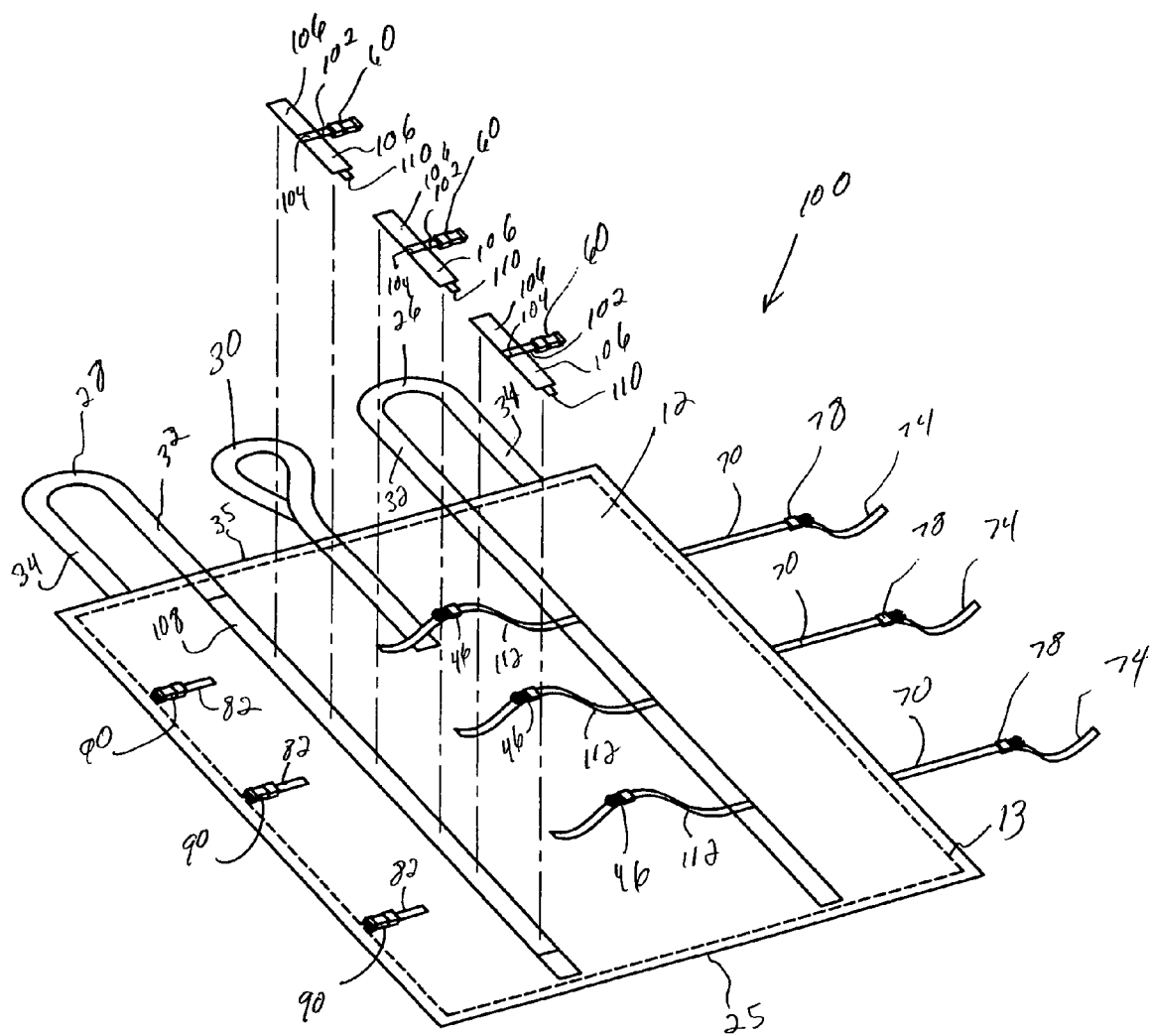
FIG. 4 is a perspective-exploded view of the device of FIG. 3 in accordance with the present invention.

Referring now to the drawings, a device for manually transporting a carcass 8 or similar sized object in accordance with the present invention is denoted by numeral 10. The device 10 includes a transport member 12 having a ground engagement side 14 and a carcass engagement side 16, at least one hauling member 18 for manually hauling the transport member 12 with a carcass 8 therein, said hauling member 18 being secured to the transport member 12, at least one carcass member 20 for securing the carcass 8 to the transport member 12, the carcass member 20 being secured to the transport member 12, and at least one closing member 22 for encasing the carcass 8 within the transport member 12, the closing member 22 being secured to the transport member 12. An optional carrying case 23 may be utilized to facilitate the storage and transport of the device 10 to the carcass site, whereupon, the transport member 12 is deployed to encase the carcass 8.

The transport member 12 is relatively lightweight and fabricated from a nylon reinforced vinyl coated material or similar tear resistant, water repellent material with a bright color such as orange to announce the presence of the person pulling the transport member 12 to other hunters. The transport member has a relatively tear resistant ground engagement side 14 and a relatively smooth carcass engagement side 16. The ground engagement side 14 is capable of being pulled over rocks, weeds and bare ground without tearing. The carcass engagement side 16 is sufficiently rugged to engage and transport a relatively large animal such as a deer without tearing, and sufficiently smooth to promote the removal of blood, dirt and weeds by simply applying water or similar cleaning fluid to the material. The transport member 12 includes a peripheral stitching 13 that binds a folded edge of the transport member 12 to provide a finished periphery that prevents shredding and/or unraveling of cut edges of the transport member 12.

A pouch or similar storage compartment 24 is optionally attached to the transport member 12 or carrying case 23 for storing items including but not limited to gloves, cleaning materials including a container of water or disinfectant liquid, carcass organ storage bags, tag ties and writing materials. The pouch 24 may be permanently or detachably secured to the transport member 12 or carrying case 23 via stitching or a hook and loop adhesive material 27 such as Velcro®. The transport member 12 includes a substantially rectangular configuration sized to receive a carcass thereupon such that the carcass is totally disposed upon the carcass engagement side 16 without any extremity extending beyond the periphery of the transport member 12. In the event that a relatively large carcass 8 is wrapped in the transport member 12 such that rear legs extend beyond a rear end 25 of the transport member 12, the carcass 8 would be sufficiently secured inside the transport member 12 such that the transport member 12 and rear legs extending therefrom would be movable by a person pulling the transport member 12 via the hauling member 18. Although intended for transporting the carcass 8 of hunted game, the device 10 may be used to manually transport a myriad of objects including but not limited to trees and shrubs, furniture, large fish, injured persons and camping equipment.

The hauling member 18 includes at least one and preferably first and second outer straps 26 and 28, and middle strap 30 fabricated from polypropylene or similar material that is woven into a webbed configuration that is light weight and extremely resistant to stretching and breakage. The first and second straps are relatively long and wide strips of polypropylene that include a long portion 32 that is secured to the carcass engagement side 16 of the transport member 12, and a short portion 34 that is secured to the ground engagement side 14 thereby forming loops that a person grasps via one hand or two to pull the transport member 12 and the carcass 8 wrapped within thereby reducing back strain when transporting a carcass over varying landscapes. The straps 26 and 28 are secured to the transport member 12 via stitching or similar permanent attachment means. The length and width of the straps 26 and 28 promote sufficient surface area to attach the straps 26 and 26 to the transport member 12 such that a heavy carcass 8 is capable of being dragged across hostile terrain without tearing the straps 26 and 28 from transport member 12. Further, the long portion 32 provides a continuous surface to which a plurality of carcass members may be fixedly or adjustably attached; and the short portion 34, which can extend a longitudinal length equal to that of the long portion 32, provides a continuous surface to which a plurality of closing members may be fixedly or adjustably attached. The first and second straps 26 and 28 allow one or two individuals to pull the device by combining or separating the straps when pulling the transport member 12.

The middle strap 30 is an optional feature of the device 10. The middle strap 30 is required when only one person is available to pull the device 10, and the head of a relatively large animal requires extra support at the front end 35 of the transport member 12. A single person pulling the device 10 would gather together all three straps 26, 28 and 30, then pull the device 10 with the carcass therein, via hand, or by clipping the three straps to a tree stand safety harness or drag harness which secured to the individual's shoulders thereby allowing his or her arms and hands free to carry a weapon or other equipment. Alternatively, two persons would each grab one strap 26 and 28, then cooperatively pull the transport member 12 and the carcass 8 wrapped therein to a transport vehicle (not depicted).

The carcass member 20 includes one or more and preferably three adjustable strap assemblies 20 fabricated from the same webbed material as the hauling member 18, but with relatively shorter lengths and widths. The strap assemblies 20 are sufficiently long to extend over the carcass 8 or object placed upon the transport member 12, and continuing in length to promote the binding of corresponding front or back legs of a deer carcass 8. The width of the strap assemblies 20 is smaller than the width of the hauling member 18 due to function of the strap assemblies 20 being retention of the carcass 8 in the transport member 12 rather than pulling the transport member. Each strap assembly 20 includes a first strap 36 having a first end 38 secured to the transport member 12 proximate to a first longitudinal edge 40 of the transport member 12. The preferred attachment location for the first end 38 to the transport member 12 is upon the long portion of the first outer strap 26 thereby reducing the risk of tearing the transport member 12 when the first strap 36 is drawn taught to ultimately secure the carcass 8 to the transport member 12. The first strap 36 has a second end 42 adjustably secured to a first end 44 of a first portion 46 of a fastener member 48 such that the first portion 46 of the fastener member 48 is slidably positioned across the first strap 36. The fastener 48 is a model Fastex SR1, manufactured by ITW Nexus of Wood Dale, Ill. 60191. The fastener 48 is protected by U.S. Pat. Nos. 4,150,464 and 4,171,555. Although straps and fasteners are the preferred elements for securing the carcass 8 to the transport member 12, alternative securing assembles that include snaps, hooks, clamps and deformable materials may substitute for the strap assemblies 20.

Each carcass member or strap assembly 20 further includes a second strap 50 having a first end 52 secured to the transport member 12 proximate a second longitudinal edge 54 of the transport member 12. The preferred attachment location for the first end 52 to the transport member 12 is upon the long portion of the second outer strap 28, further reducing the risk of tearing the transport member 12 when the first strap 36 is drawn or cinched tight to secure the carcass 8 to the carcass engagement side 16 of the transport member 12. The second strap 50 has a second end 56 secured to a first end 58 of a second portion 60 of the fastener member 48. The first and second portions 46 and 60 of the fastener member 48 have cooperating second ends 62 that detachably join such that a carcass 8 is ultimately secured to the transport member 12 via the second end 42 of the first strap 36 after the second end 42 is forcibly and distally pulled by the hunter from joined second ends 62 of the first and second portions 46 and 60 of the fastener member 12. The second end 62 of the first portion 46 of the fastener member 48 includes means for manually releasing (physically "squeezing" outer portions of the second end 62 of the first portion 46 inwardly via outer side recesses in the second portion 60) the first portion 46 of the fastener member 48 from the second portion 60 of the fastener member 48 thereby allowing the first and second portions 46 and 60 to be manually separated to promote the removal of the carcass 8 from the transport member 12.

The closing member 22 includes one or more and preferably three adjustable strap assemblies 22 fabricated from the same material as the hauling member 18, and with substantially the same dimensions as the carcass member 20. Each strap assembly 22 includes a webbing strap 70 having a first end 72 secured to the transport member 12 proximate to the first longitudinal edge 40 of the transport member 12. The first strap 70 has a second end 74 adjustably secured to a first end 76 of a first portion 78 of a fastener member 80 such that the first portion 78 of the fastener member 80 is slidably positioned across the first strap 70. The fastener 80 is the same model and manufacture as the fastener 48 for the carcass member 20 discussed supra. Further, the substitute carcass member assemblies (hooks, clamps, etc.) discussed supra, may be used for the closing members 22.

Each strap assembly 22 further includes a second strap 82 having a first end 84 secured to the transport member 12 proximate the second longitudinal edge 54 of the transport member 12. The second strap 82 has a second end 86 secured to a first end 88 of a second portion 90 of the fastener member 80. The first and second portions 78 and 90 of the fastener member 80 have cooperating second ends 92 that detachably join such that a carcass 8 is ultimately encased within the transport member 12 via the second end 74 of the first strap 70 being forcibly and distally moved by the hunter from joined second ends 92 of the first and second portions 78 and 90 of the fastener member 80. The second end 92 of the first portion 78 of the fastener member 80 includes means for manually releasing (physically squeezing outer portions of the second end 92 of the first portion 78 inwardly via outer side recesses in the second portion 90) the first portion 78 of the fastener member 80 from the second portion 90 of the fastener member 80 thereby allowing the first and second portions 78 and 90 to be manually separated to promote the separation of the first and second longitudinal edges 40 and 54 of the transport member 12 to expose the carcass 8 secured therein.

A feature of the device 10 is to totally encase or wrap the carcass 8 with the transport member 12 after securing the carcass 8 to the carcass engagement side 16 of the transport member 12. To achieve this feature, the long portion 32 of the first outer strap 26 is secured to the carcass engagement side 16 of the transport member 12. The long portion 32 is then separated from the first longitudinal edge 40 of the transport member 12 a distance greater than the distance separating the short portion 34 of the first outer strap 26 from the first longitudinal edge 40, the short portion 34 being secured to the ground engagement side 14 of the transport member 12. The first ends 38 of one or more (preferably three) first straps 36 of the carcass member 20 are spaced upon and secured to the long portion 32 of the first outer strap 26, and the first ends 72 of one or more (preferably three) first straps 70 of the closing member 22 are spaced upon and secured to the short portion 34 of the first outer strap 26 and the ground engagement side 14.

Further, to achieve the total encasement of the device about the carcass 8, the long portion 32 of the second outer strap 28 is secured to the carcass engagement side 16 of the transport member 12. The long portion 32 is then separated from the second longitudinal edge 54 of the transport member 12 a distance greater than the distance separating the short portion 34 of the second outer strap 28 from the second longitudinal edge 54, the short portion 34 being secured to the ground engagement side 14 of the transport member 12. The first ends 52 of the second straps 50 of the carcass member 20 are spaced upon and secured to the long portion 32 of the second outer strap 28, and the first ends 84 of the second straps 82 of the closing member 22 are spaced upon and secured to the short portion 34 of the second outer strap 28.

After cinching the carcass 8 tightly to the transport member 14 via the carcass member 22, the distances separating respective long and short portions 32 and 34 of the first and second outer straps 26 and 28, allow the first and second longitudinal edges 40 and 54 and cooperating portions of the transport member 12 to overlap thereby encasing or wrapping the carcass 8. The second ends 92 of the first and second portions 78 and 90 of the closing fastener member 80 are then detachably joined, and the second ends 74 of the first straps 70 are pulled to tightly cinch the transport member 12 about the carcass 8.

A carcass 8 or other objects transported by the device 10 may include configurations that the carcass member 20 cannot tightly secure to the transport member 12 due to the fixed positions of the first ends 38 and 52 of respective first and second webbing straps 36 and 50 of the carcass member 20. A carcass 8 or object not tightly secured to the transport member 12 will ultimately slide from the wrapped transport member 12 via the rear end 25. To facilitate the use of the device 10 to transport a carcass 8 or object with an unconventional configuration, means for adjustably securing the first end 52 of the second strap 50 to the transport member 12 are provided.

Referring now to FIGS. 3-13, an alternative device 100 is depicted with carcass second straps 102 that include first ends 104 secured to first adhesive members 106, and a second adhesive member 108 completely covering and secured to the long portion 32 of the second outer strap 28. The first adhesive members 106 are fabricated from a hook material, and the second adhesive member 108 is fabricated from a loop material. Typically, both hook and loop materials are included in Velcro®, a well know adhesive material. The first adhesive member 106 includes a grasping member 110 for promoting the manual separation of the first adhesive member 106 from the second adhesive member 108, thereby facilitating the re-use of the device when varying the size of the carcass or object to be transported by the device 100. The first adhesive members 106 are dimensioned to congruently engage a cooperating portion of the second adhesive member 108 such that the carcass 8 or object encased by the transport member 12 is tightly secured therein. The larger and/or heavier the carcass 8 or object, the longer the longitudinal dimension of the first adhesive members 106 to maintain engagement with the second adhesive member 108 when manually pulling the device 10. However, the longitudinal dimension of the first adhesive members 106 is limited by the longitudinal dimension of the long portion 32 of the second outer strap 28. To tightly secure the carcass 8 or object having an unconventional configuration, more first and second straps 112 and 102 (more than three) may be required tightly secure the carcass 8 or object to the transport member 12.

Utilizing adhesive members 106 and 108 for the first ends 104 of the second straps 102 with a uniquely configured carcass 8 or object may result in the first and second straps 112 and 102 forming an acute angle with the long portions 32 of the first and second outer straps 26 and 28, instead of the typical right angle. Varying from the right angle orientation can reduce the "grasp" of the straps 112 and 102 upon the carcass 8. To prevent the acute angle orientation, the adjustable securing means discussed above for the first ends 104 of the second straps 102, can be included (although not depicted) with the first ends 38 (see FIG. 1) of the first straps 36 of the carcass member 20. Further, the adjustable securing means discussed above may be included with the first ends 72 and 84 of respective first and second straps 70 and 82 of the closing member 22, thereby promoting a tight encasement of transport member 12 about the unconventionally configured carcass 8 or object.

Figure 5:
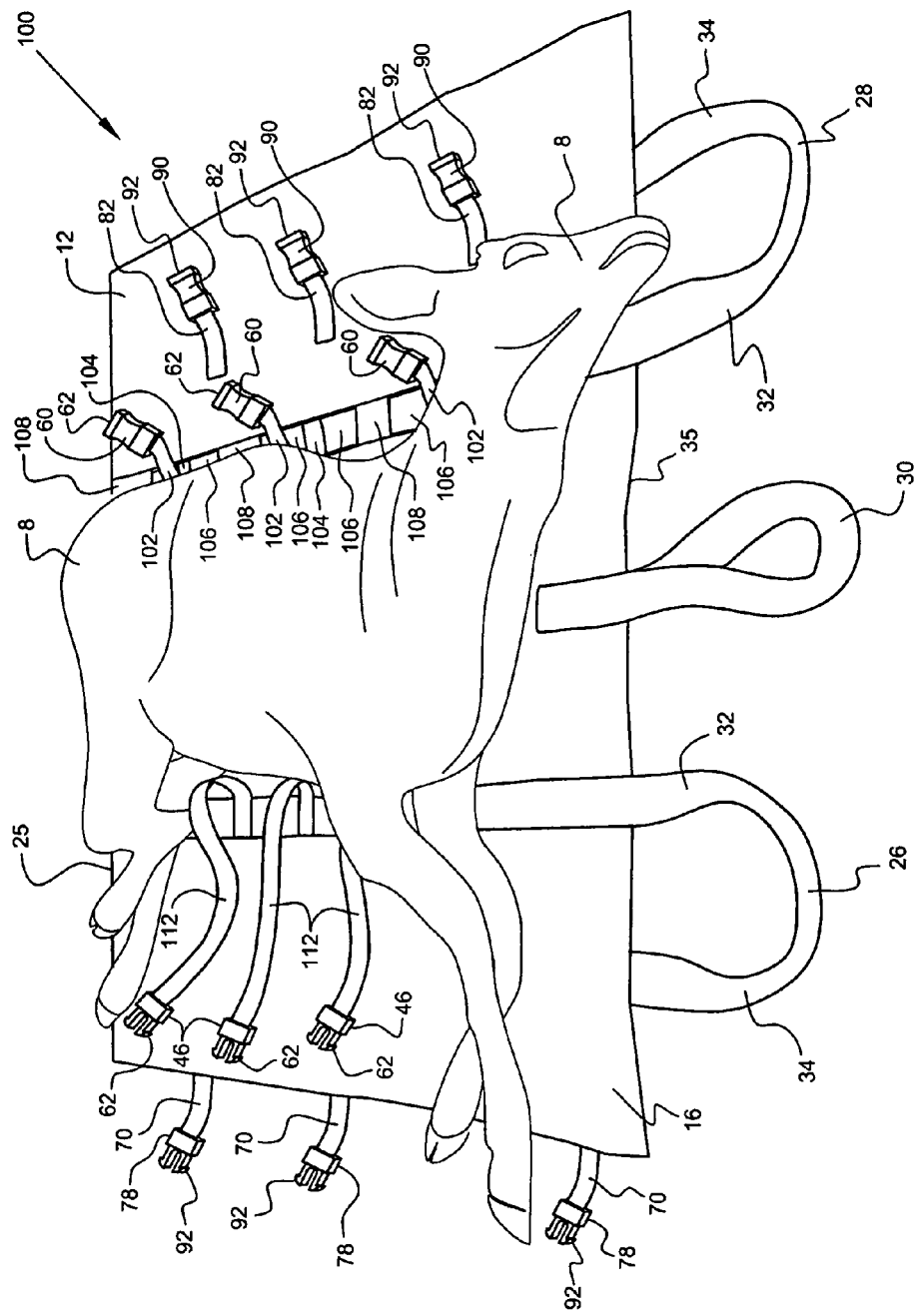
FIG. 5 is a perspective view of the device of FIG. 3, but with the device rotated 180 degrees and with a deer carcass thereupon in accordance with the present invention.
Figure 6:
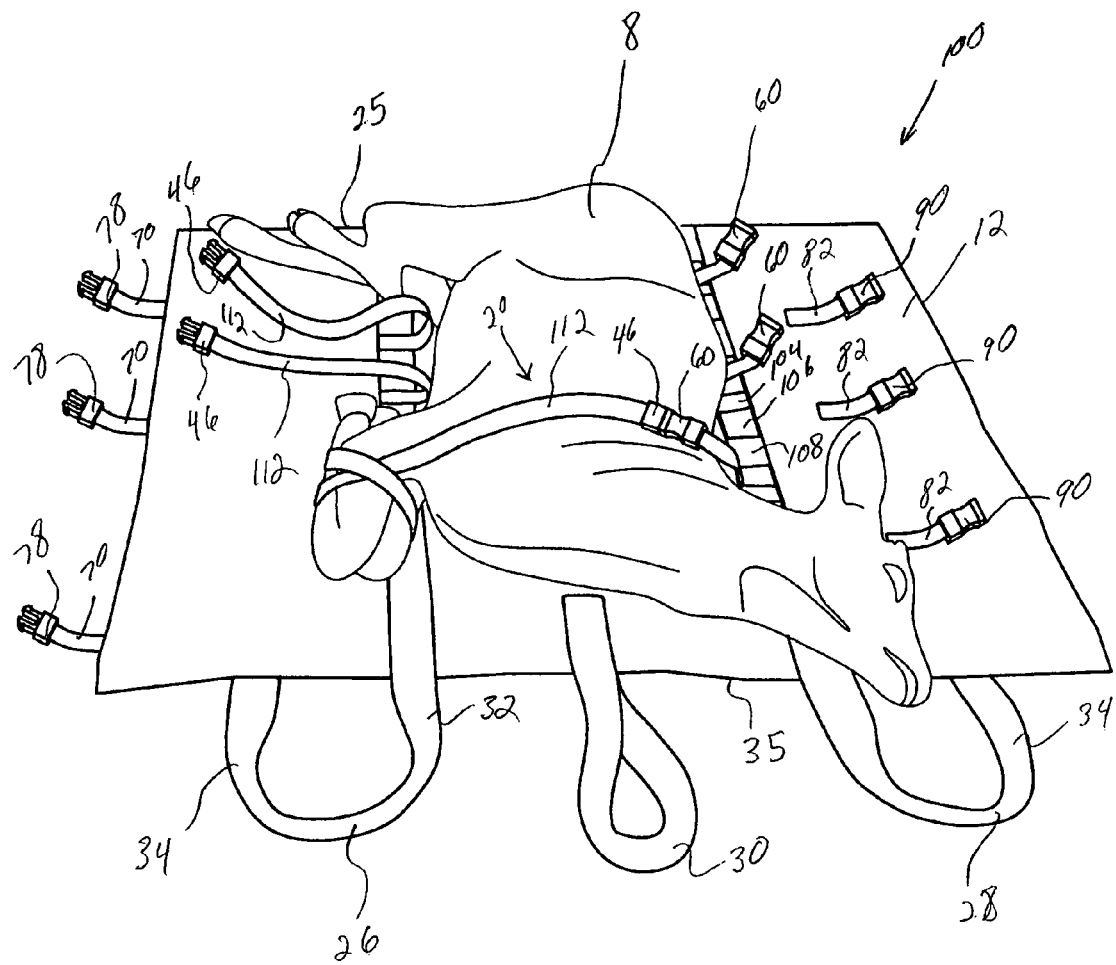
FIG. 6 is a perspective view of the device and deer of FIG. 5, but with one carcass member securing the front legs and a portion of the body of the deer to a transport member.
Figure 7:
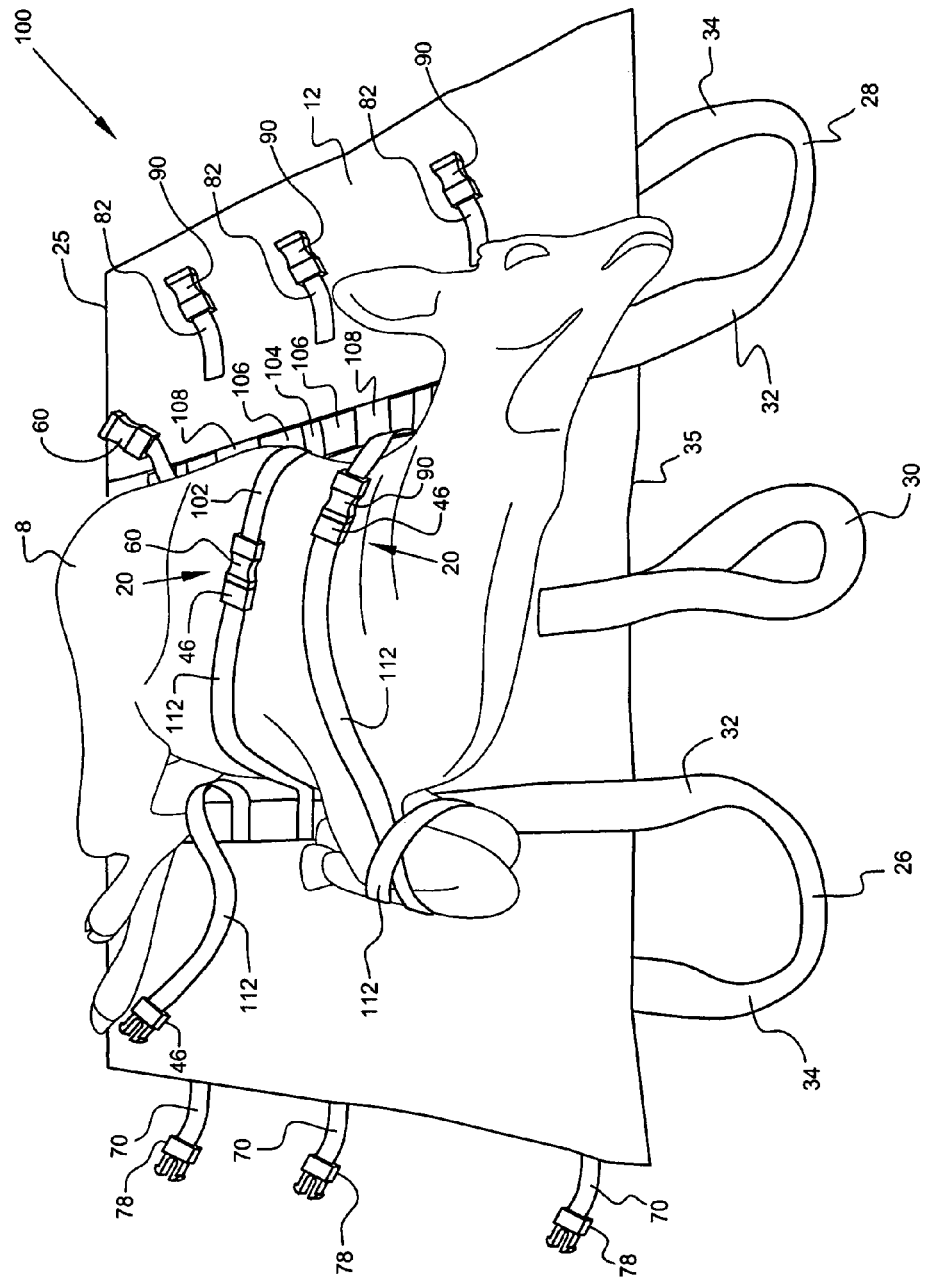
FIG. 7 is a perspective view of the device and deer of FIG. 6, but with one carcass member securing the front legs and a portion of the body of the deer to the transport member, and a second carcass member securing a second portion of the body of the deer to the transport member.
Figure 8:
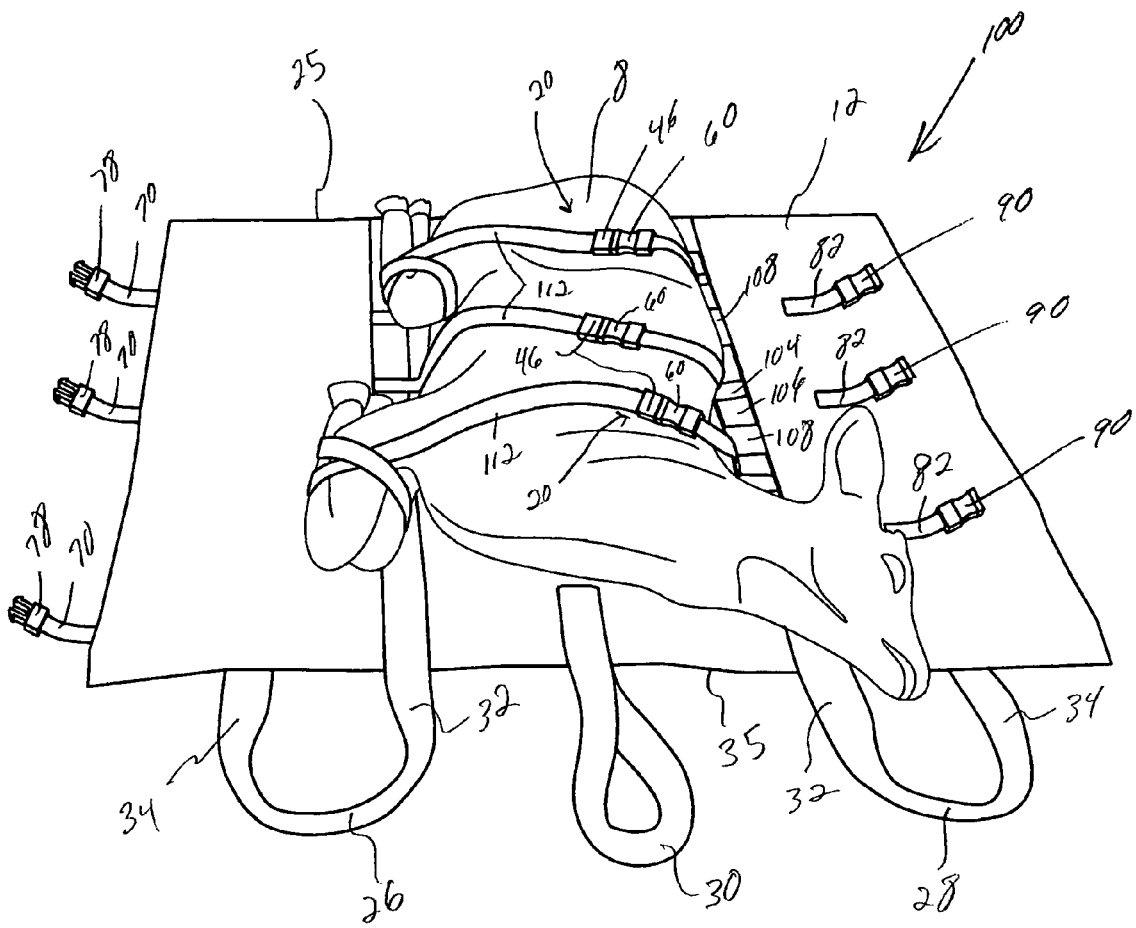
FIG. 8 is a perspective view of the device and deer of FIG. 7, but with one carcass member securing the front legs and a portion of the body of the deer to the transport member, a second carcass member securing a second portion of the body of the deer to the transport member, and a third carcass member securing the rear legs and a third portion of the body of the deer to the transport member.
Figure 9:
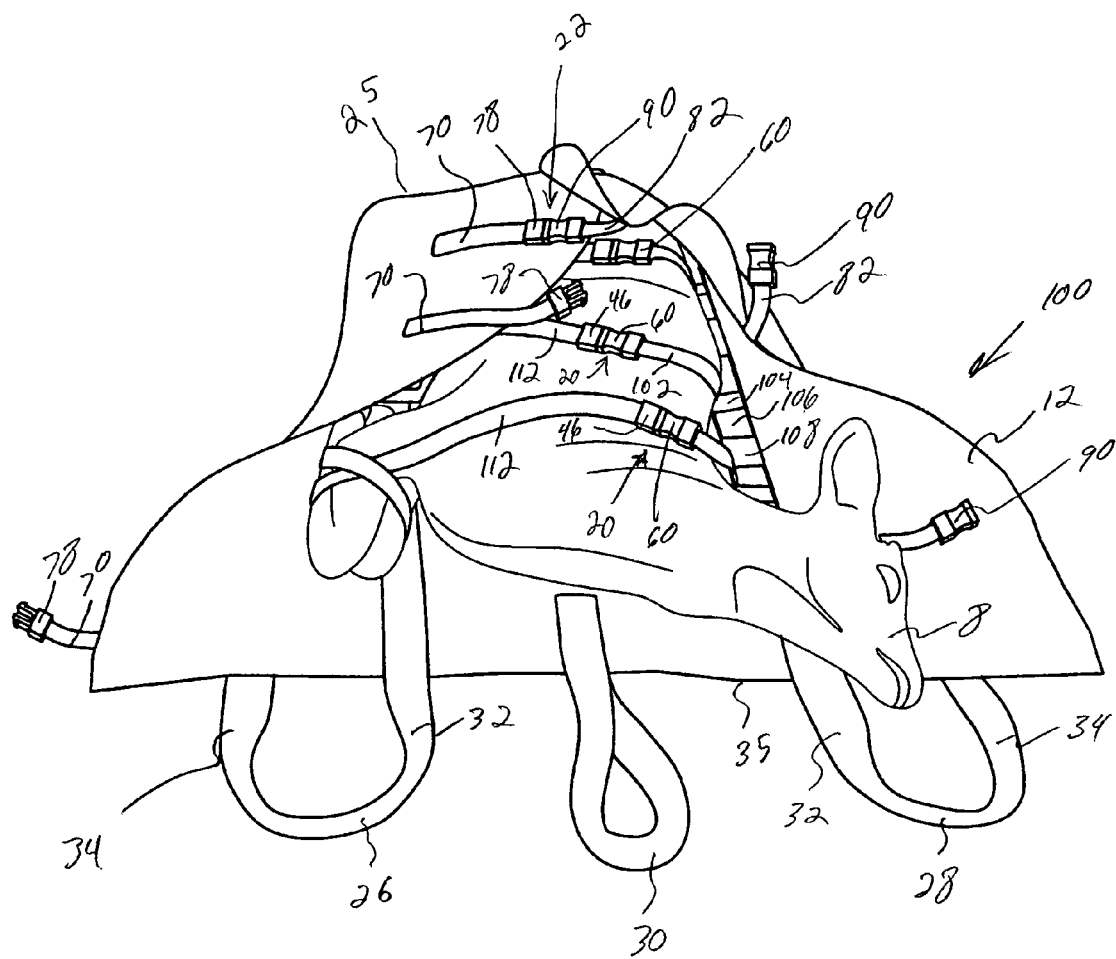
FIG. 9 is a perspective view of the device and deer of FIG. 8, but with one closing member securing a rear portion of the transport member about a rear portion of the deer.
Figure 10:
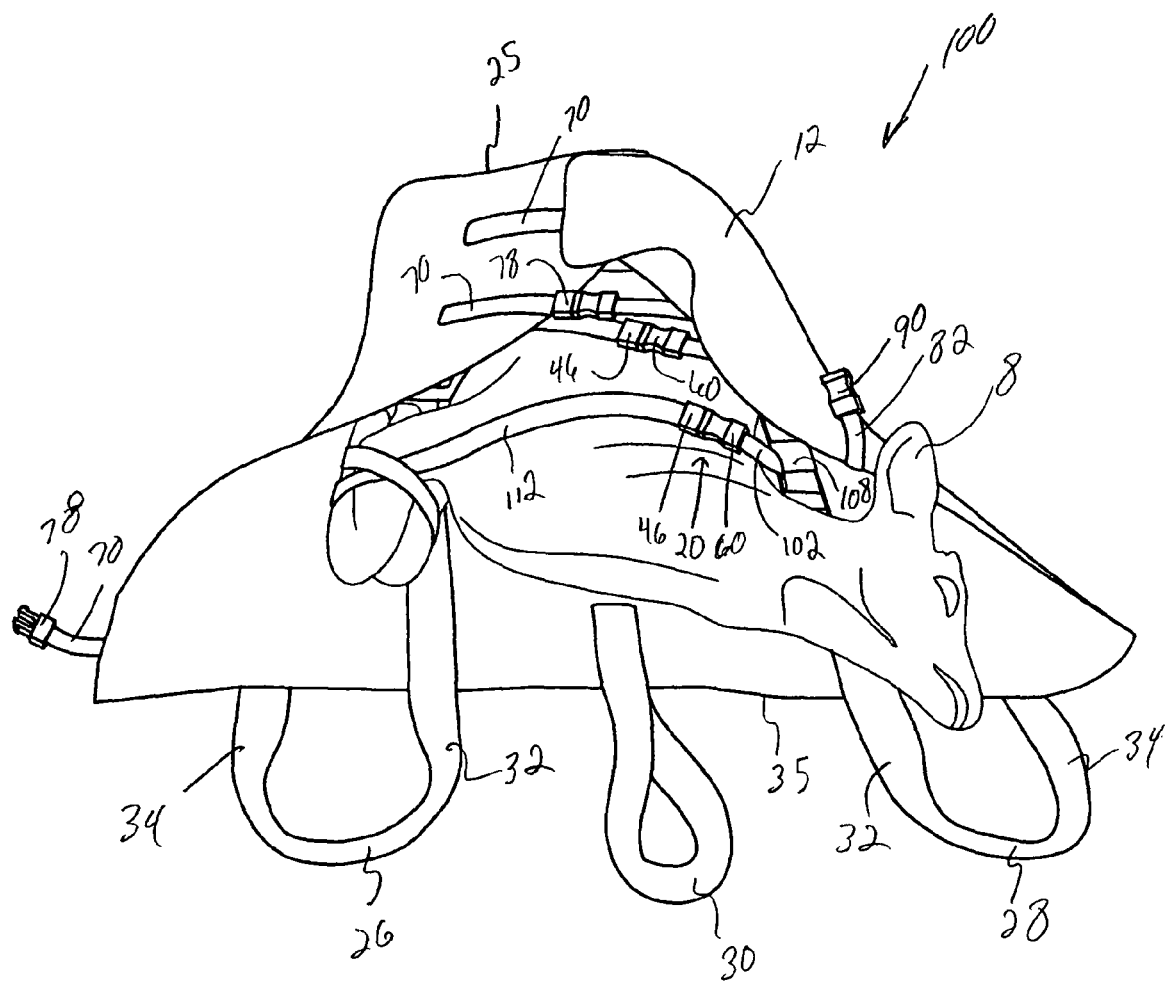
FIG. 10 is a perspective view of the device and deer of FIG. 9, but with two closing members securing rear and mid-portions of the transport member about rear and mid-portions of the deer.
Figure 11:
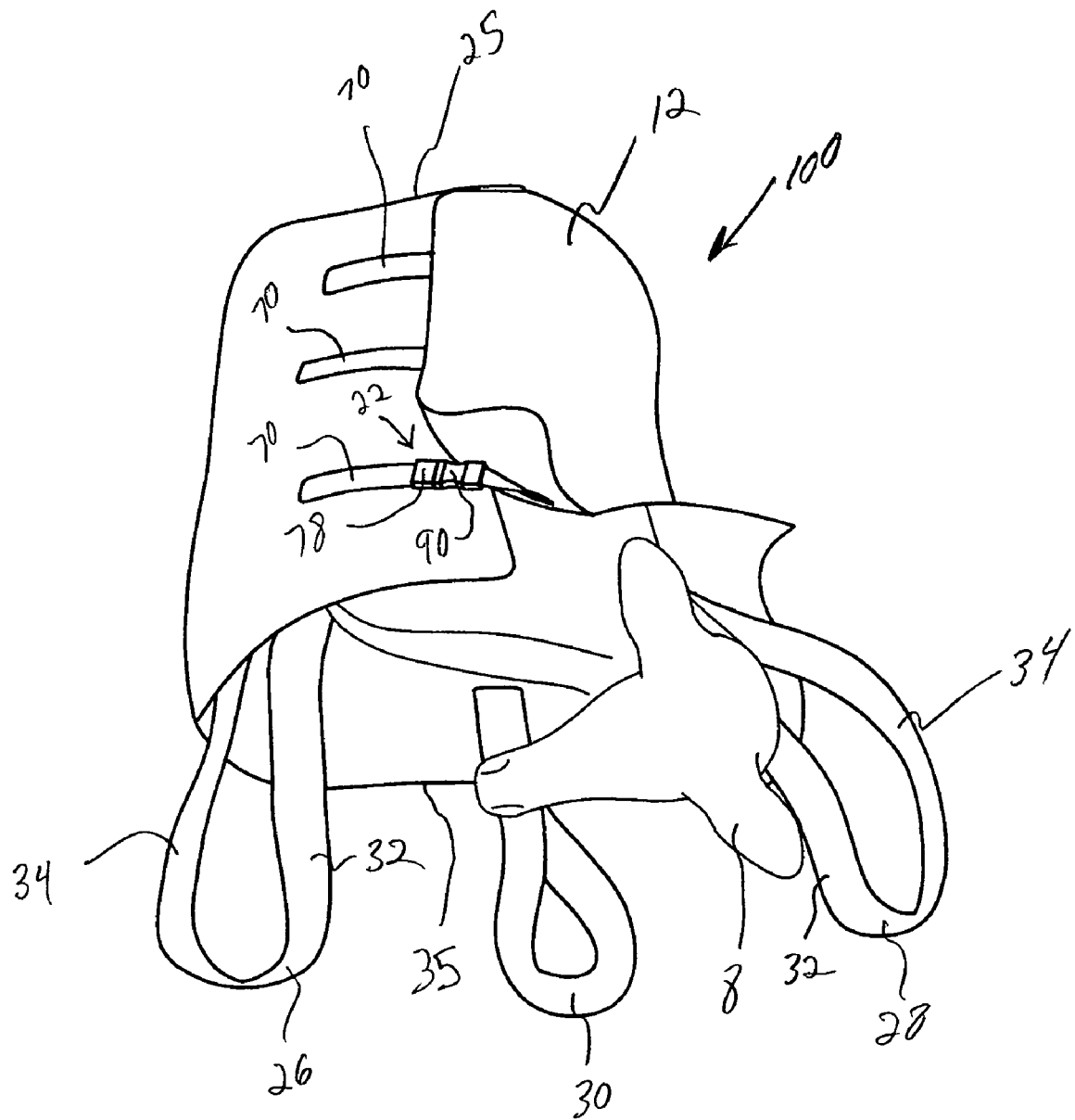
FIG. 11 is a perspective view of the device and deer of FIG. 10, but with three closing members securing rear, mid and front portions of the transport member about rear, mid and front portions of the deer.
Figure 12:
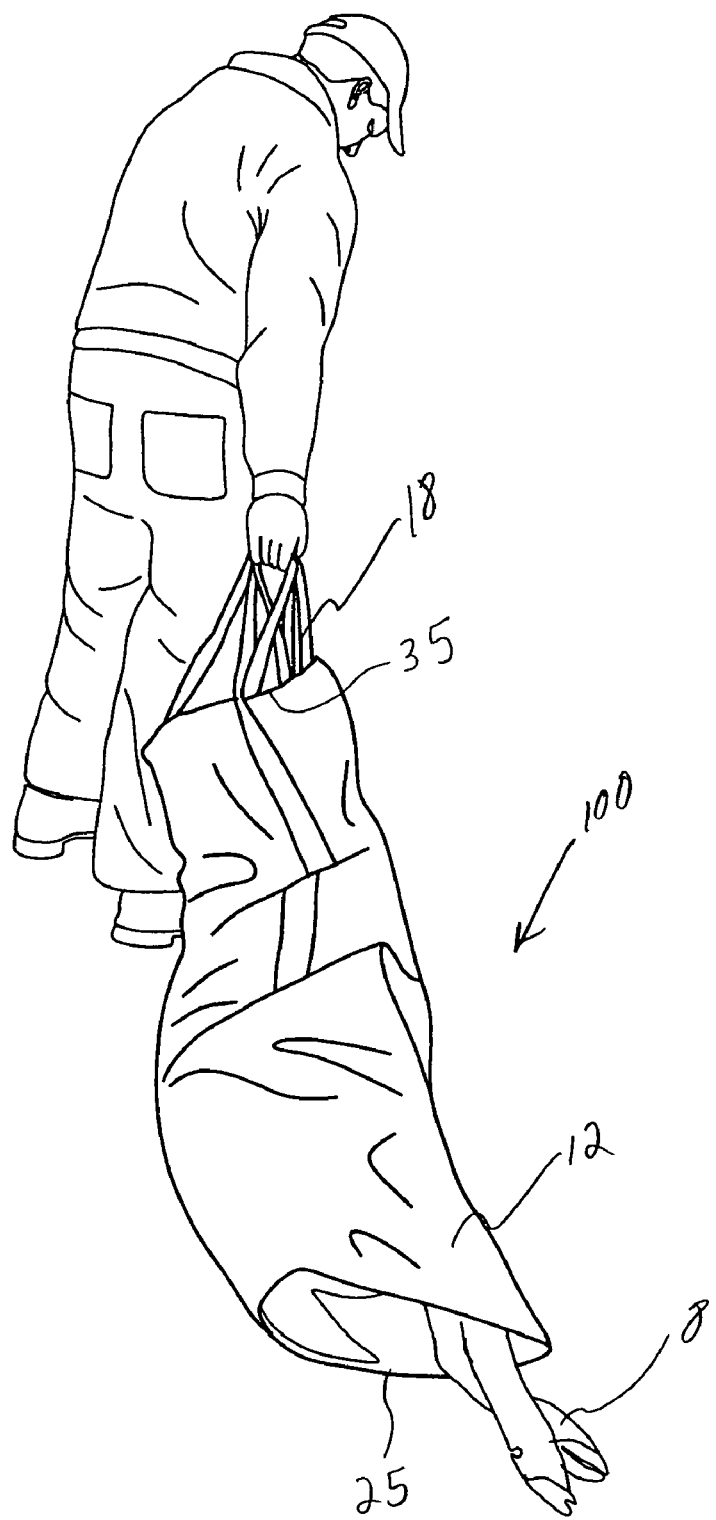
FIG. 12 is a perspective view of the transport member encasing the deer, and of the hunter pulling the transport member via hauling members in accordance with the present invention.
Figure 13:
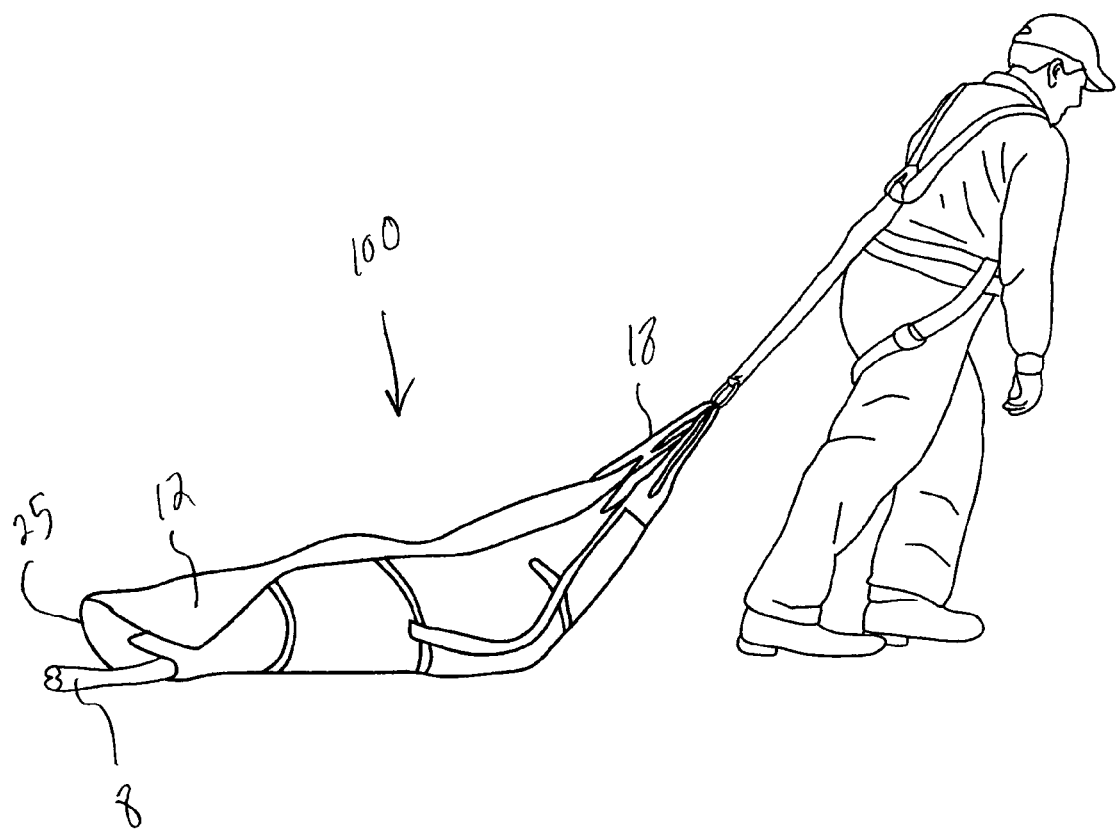
FIG. 13 is a perspective view of the transport member encasing the deer, and of the hunter pulling the transport member via a harness detachably secured to the hauling members in accordance with the present invention.
Figures 14, 15:
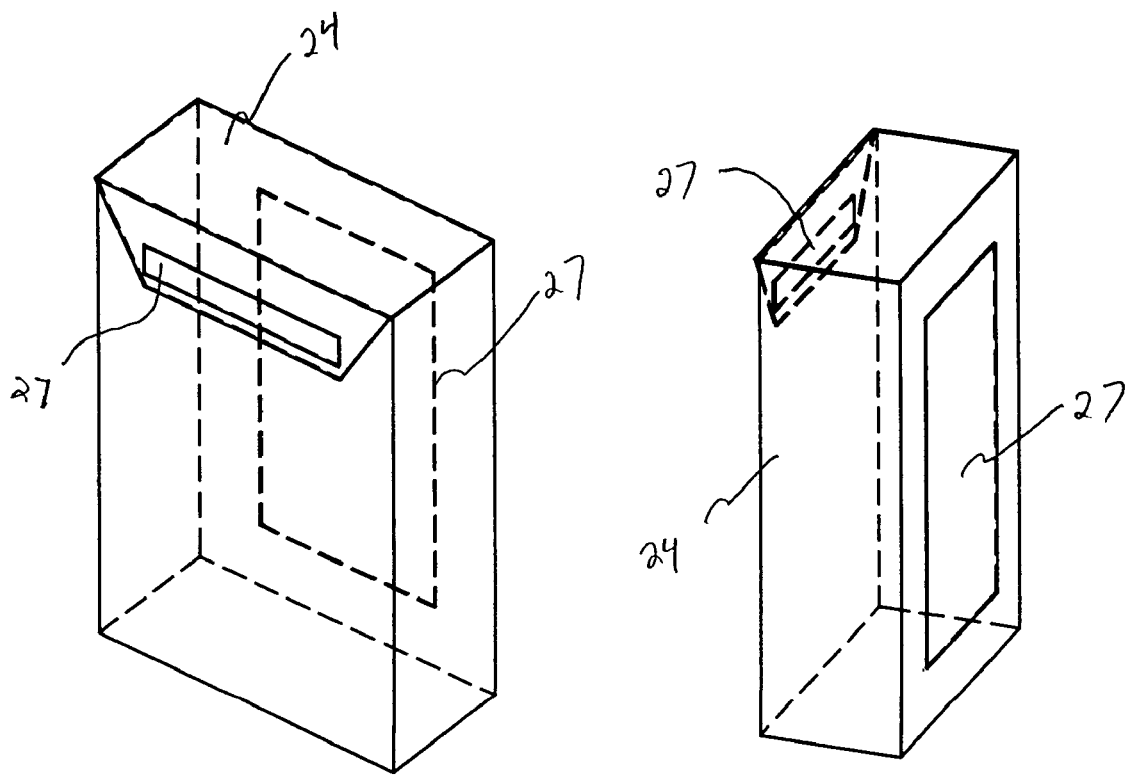
FIG. 14 is a phantom front perspective view of an optional pouch for containing a field dressing kit and cleaning supplies in accordance with the present invention.
FIG. 15 is a phantom side perspective view of the pouch of FIG. 14.
Figure 16:
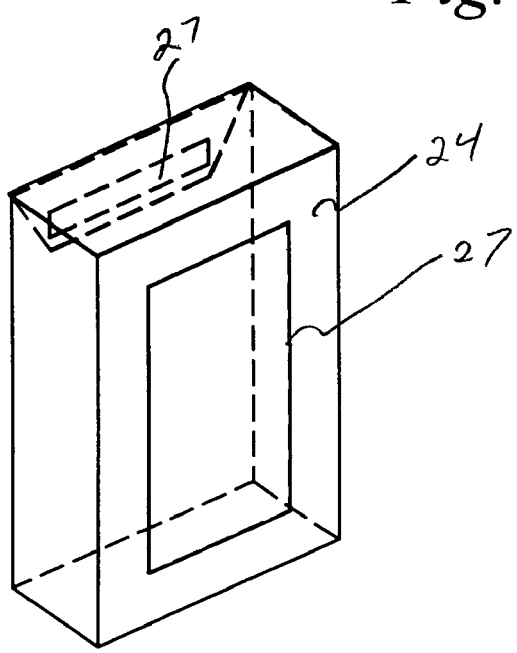
FIG. 16 is a phantom back perspective view of the pouch of FIG. 14.
Figure 17:
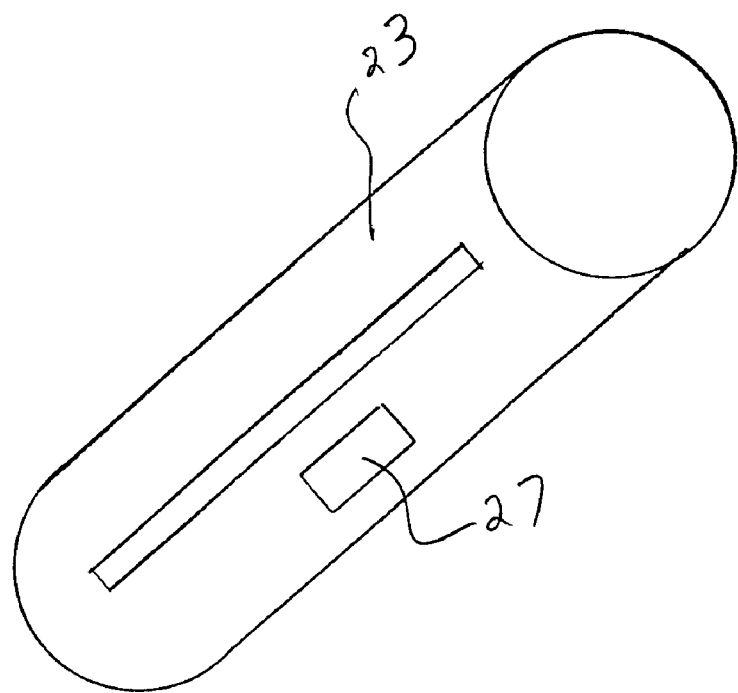
FIG. 17 is a perspective view of an optional carrying case for transporting the device in accordance with the present invention.

In operation, a substantially rectangular configured transport member 12 fabricated from nylon reinforced vinyl coated, or similar impervious "tough" material is dimensioned to completely wrap or encase a preselected animal carcass 8 or object. One or more carcass members 20 for securing the carcass 8 to the transport member 12 are comprised of first and second straps 36 and 50 fabricated from non-deformable material such as a webbing material, and fasteners fabricated from a rigid material such as plastic, are secured via first ends 38 and 52 to the transport member 12 at predetermined positions, preferably upon long portions 32 of respective first and second outer straps 26 and 28. One or more closing members for tightly securing the transport member 12 about the carcass 8 are comprised of first and second straps 70 and 82 fabricated from non-deformable material, and fasteners fabricated from a rigid material such as plastic, are secured via first ends 72 and 84 to the transport member at predetermined positions, preferably upon short portions 34 of respective first and second outer straps 26 and 28. The carcass 8, generally a deer, is disposed upon the transport member as depicted in FIG. 5, whereupon, first and second fastener portions 46 and 60 are coupled together, and the first straps 36 cinched tight about predetermined portions of the deer by pulling the second ends 42 of the first straps 36 (see FIGS. 1 and 6-8). The transport member 12 is wrapped about the carcass 8 via overlapping first and second edges 40 and 54, whereupon, first and second fastener portions 78 and 90 are coupled together, and the first straps 70 cinched tight about predetermined portions of the deer by pulling the second ends 74 of the first straps 70 (see FIGS. 1 and 9-11).

In the event that adjustable securing means are required for any of the carcass and/or closing members 20 and 22, first ends 38 and 52 of first and second straps 36 and 50 are permanently joined to first adhesive members 106, and/or first ends 72 and 84 of first and second straps 70 and 82 are permanently joined to first adhesive members 106. Second adhesive members 108 are permanently joined to preselected portions of the transport member 12, preferably upon the long portions 32 of the first and second outer straps 26 and 28, and/or the short portions 34 of the first and second outer straps 26 and 28. The first adhesive members 106 with the corresponding straps attached thereto, are then disposed upon the selected second adhesive members 108 such that the deer carcass 8 is tightly secured to the transport member 12, and such that the transport member 12 is tightly wrapped about the deer carcass 8.

Referring to FIGS. 5-10, in the event that either carcass 8 is not tightly secured to the transport member 12, or the transport member 12 is not tightly wrapped about the carcass 8, a person opens the transport member 12, separates selected first adhesive members 106 from second adhesive members 108 by pulling on the grasping member 110 thereby "peeling" the first member 106 from the second member 108, re-positions the first adhesive member 106 upon the second adhesive member 108, re-cinches first straps 36 about the carcass 8, and re-cinches first straps 70 about the transport member 12 to tightly encase the carcass 8 thereby allowing a person the pull the device 100 and the carcass therein 8 over varying terrain.

The foregoing description is for purposes of illustration only and is not intended to limit the scope of protection accorded this invention. The scope of protection is to be measured by the following claims, which should be interpreted as broadly as the inventive contribution permits.

The invention claimed is:

1. A device that snugly wraps and deforms about a deer carcass, said device minimizing the manual force required for one person to manually drag the deer carcass upon a ground surface comprising:

a deformable transport member fabricated from a continuous piece of polymer material and dimensioned to snugly wrap and deform about a deer carcass in a size range corresponding to the dimensions of said transport member, said transport member being wrapped about the deer carcass such that the distance between a carcass engagement side of said transport member and the deer carcass is minimized to eliminate space between said carcass side and the deer carcass, thereby minimizing surface area of a transport side of said transport member to minimize the manual force required for one person to manually drag said deformable transport member with the deer carcass therein upon a ground surface, said carcass engagement side and a ground engagement side of said transport member having minimal space therebetween, said transport member being snugly wrapped and deformed about the deer carcass such that a head portion and substantially all of a body portion of the deer carcass are encased, the head portion being disposed proximate to a front portion of said transport member thereby aligning the head and body of the deer carcass with a longitudinal portion of said deformable transport member;

a hauling member for manually dragging said transport member with the deer carcass therein, said hauling member being secured to longitudinal portions along the whole length of said carcass engagement side and along a longitudinal midpoint of said ground engagement side of said transport member thereby aligning said hauling member with the head and body of the deer carcass, said aligned hauling member and deer carcass cooperating with said snug wrapping and deformation of said deformable transport member about the deer carcass to reduce the manual force required for one person to manually drag said transport member with the deer carcass wrapped therein upon the ground surface;

a plurality of adjustably positioned carcass members for securing the deer carcass to said carcass engagement side of said transport member, said carcass members being detachably secured to cooperating long portions of said hauling member to prevent tearing of said transport member and to dispose said carcass members to engage portions of the deer carcass such that the distance between said carcass side of said transport member and the deer carcass is minimized when said carcass members are cinched tight to forcibly engage the deer carcass to eliminate space between said carcass engagement side and the deer carcass, thereby minimizing the surface area of said transport side of said transport member to reduce the manual force required for one person to manually drag said deformable transport member with the deer carcass therein upon a ground surface; and a plurality of adjustably positioned closing members for tightly overlapping and securing said transport member about the deer carcass to encase the deer carcass within said transport member after said carcass members have secured the deer carcass to said carcass engagement side, said plurality of closing members being secured to said ground engagement side of said transport member, thereby allowing said closing members to be tightly cinched about said transport member and the deer carcass therein to minimize the distance between said carcass side of said transport member and the deer carcass to eliminate space between said carcass side and the deer carcass, thereby minimizing the surface area of said transport side of said transport member to reduce the manual force required for one person to manually drag said deformable transport member with the deer carcass therein upon a ground surface.

2. The device of claim 1 wherein said transport member includes a peripheral stitching that binds a folded edge of said transport member to prevent shredding of peripheral edges.

3. The device of claim 1 wherein said transport member is dimensioned to totally encase a deer carcass.

4. The device of claim 1 wherein said ground engagement side includes means for slidably engaging varying ground surfaces such that the transport member is not damaged.

5. The device of claim 1 wherein said carcass engagement side includes means for removing carcass elements from the transport member.

6. The device of claim 1 wherein said transport member is dimensioned to encase a deer carcass such that rear legs of the deer carcass are allowed to extend from a rear portion of said transport member and said transport member includes a pouch secured thereto.

7. The device of claim 1 wherein said hauling member includes a first outer strap extending longitudinally across a substantial portion of both of said carcass engagement and ground engagement sides of said transport member, said longitudinal extension of said first outer strap upon said carcass engagement side being substantially equal in length to the length of said first outer strap upon said ground engagement side.

8. The device of claim 1 wherein said carcass members comprise:
   a first strap having a first end secured to said transport member proximate to a first longitudinal edge of said transport member, said first strap having a second end adjustably secured to a first end of a first portion of a fastener member such that said first portion of said fastener member is slidably positioned across said first strap; and
   a second strap having a first end secured to said transport member proximate a second longitudinal edge of said transport member, said second strap having a second end secured to a first end of a second portion of said fastener member, said first and second portions of said fastener member having cooperating second ends that detachably join such that a carcass is secured to said transport member via said second end of said first strap being distally moved from joined second ends of said first and second portions of said fastener member; said second end of said first portion of said fastener member including means for manually releasing said first portion of said fastener member from said second portion of said fastener member thereby allowing said first and second portions to be manually separated to promote the removal of the carcass from said transport member.

9. The device of claim 1 wherein said closing members comprise:
   a first strap having a first end secured to said transport member proximate to a first longitudinal edge of said transport member, said first strap having a second end adjustably secured to a first end of a first portion of a fastener member such that said first portion of said fastener member is slidably positioned across said first strap; and
   a second strap having a first end secured to said transport member proximate a second longitudinal edge of said transport member, said second strap having a second end secured to a first end of a second portion of said fastener member, said first and second portions of said fastener member having cooperating second ends that detachably join such that a carcass is encased within said transport member via said second end of said first strap being distally moved from joined second ends of said first and second portions of said fastener member, said second end of said first portion of said fastener member including means for manually releasing said first portion of said fastener member from said second portion of said fastener member thereby allowing said first and second portions to be manually separated to promote the separation of said first and second longitudinal edges of said transport member to expose the carcass secured within.

10. The device of claim 1 wherein said hauling member includes a drag harness detachably secured thereto, said drag harness engaging a person's shoulders to increase the pulling force imparted upon said transport member by the person.

11. The device of claim 1 wherein said carcass members and said closing members cooperate with said hauling member to maintain the longitudinal orientation of the deer carcass in substantially lineal relationship with said hauling member, thereby reducing the manual force required for one person to manually drag said deformable transport member with the deer carcass therein upon a ground surface.

12. The device of claim 7 wherein said hauling member includes a second outer strap extending longitudinally across a substantial portion of both of said carcass engagement and ground engagement sides of said transport member, said longitudinal extension of said second outer strap upon said carcass engagement side being substantially equal in length to the length of said second outer strap upon said ground engagement side.

13. The device of claim 8 wherein said first end of said first strap is secured to a carcass engagement side of said transport member, said first end being secured a predetermined distance from said first longitudinal edge of said transport member.

14. The device of claim 8 wherein said first end of said second strap is secured to a carcass engagement side of said transport member, said first end being secured a predetermined distance from said second longitudinal edge of said transport member.

15. The device of claim 8 wherein said first end of said second strap includes means for adjustably securing said first end of said second strap to said transport member.

16. The device of claim 9 wherein said first end of said first strap is secured to said ground engagement side of said transport member, said first end being secured a predetermined distance from said first longitudinal edge of said transport member, said predetermined distance being less than a distance separating a first end of a first strap of said carcass member from said first longitudinal edge of said transport member thereby promoting the wrapping of a first longitudinal edge portion of said transport member about the carcass.

17. The device of claim 9 wherein said first end of said second strap is secured to a carcass engagement side of said transport member, said first end being secured a predetermined distance from said second longitudinal edge of said transport member, said predetermined distance being less than a distance separating a first end of a second strap of said carcass member from said second longitudinal edge of said transport member thereby promoting the wrapping of a second longitudinal edge portion of said transport member about the carcass.

18. The device of claim 15 wherein said adjustable securing means includes securing said first end of said second strap to a first adhesive member, and securing a second adhesive member to a portion of said transport member, said first and second portions being removably joined together such that said second portion of said fastener member is disposed to facilitate the securing of the carcass to said transport member.

19. The device of claim 18 wherein said first adhesive member includes a grasping member to promote the manual separation of said first adhesive member from said second adhesive member thereby facilitating the re-use of said device when the size of the carcass to be transported varies.

20. The device of claim 18 wherein said first adhesive member includes hooks and said second adhesive member includes loops.

21. A hunting device for dragging game animals comprising:
- a transport member having a carcass engagement side and a ground engagement side, said carcass engagement and ground engagement sides defining a relatively thin transport member that snugly wraps about an animal carcass engagement such that space between said carcass engagement side and the animal carcass is minimized, thereby reducing the manual force required for manually dragging said transport member with the animal carcass therein upon a ground surface;
- hauling means for manually dragging said transport member with the animal carcass therein upon a ground surface, said hauling means being secured to longitudinal portions along the whole length of said carcass engagement side and along a longitudinal midpoint of said ground engagement side of said transport member thereby aligning said hauling means with the head and body of the animal carcass, said aligned hauling means and animal carcass cooperating with said snug wrapping of said transport member about the animal carcass to reduce the manual force required for manually dragging said transport member with the animal carcass wrapped therein upon the ground surface;
- means for securing the animal carcass to said carcass engagement side of said transport member, said securing means being detachably secured to cooperating long portions of said hauling means to prevent tearing of said carcass encasement member and to dispose said securing means to engage portions of the animal carcass such that the distance between said carcass side of said transport member and the animal carcass is minimized when said securing means are cinched tight to forcibly engage the deer carcass to minimize space between said carcass engagement side and the animal carcass, thereby minimizing the surface area of said ground engagement side of said transport member to reduce the manual force required for manually dragging said transport member with the animal carcass therein upon a ground surface;
- means for tightly overlapping said transport member about the animal carcass after the animal carcass is secured to said carcass engagement side, thereby minimizing the distance between said carcass engagement side of said transport member and the animal carcass to reduce space between said carcass engagement side and the animal carcass to minimize the surface area of said ground engagement side of said transport member to reduce the manual force required for manually dragging said transport member with the animal carcass therein upon a ground surface; and
- means for maintaining said transport member about the animal carcass.

22. The device of claim 21 wherein said pulling means includes a first outer strap longitudinally extending across a substantial portion of both of said carcass engagement and ground engagement sides of said transport member, said longitudinal extension of said first outer strap upon said carcass engagement side being substantially equal in length to the length of said first outer strap longitudinal extension upon said ground engagement side.

23. The device of claim 22 wherein said pulling means includes a second outer strap longitudinally extending across a substantial portion of both of said carcass engagement and ground engagement sides of said transport member, said longitudinal extension of said second outer strap upon said carcass engagement side being substantially equal in length to the length of said second outer strap longitudinal extension upon said ground engagement side.

* * * * *